R. JAFFIE.
HORSESHOE.
APPLICATION FILED SEPT. 18, 1914.
1,129,683.
Patented Feb. 23, 1915.
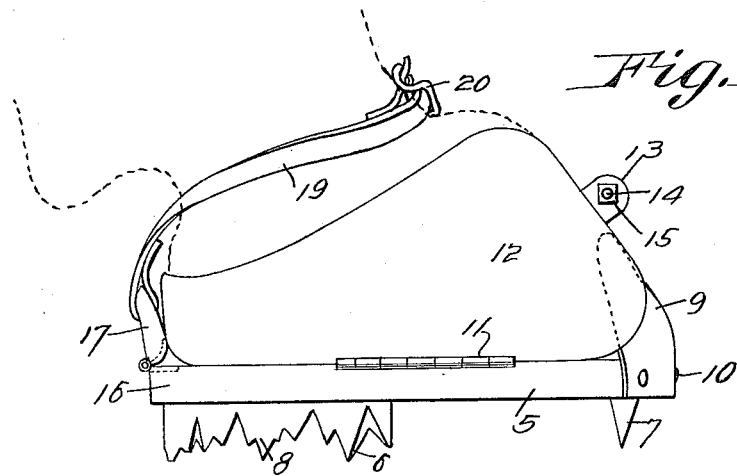
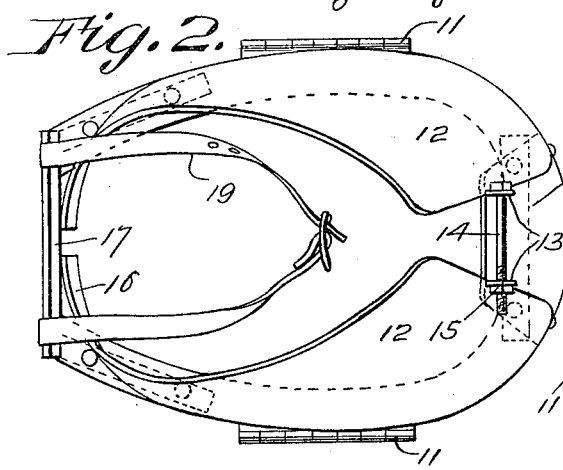
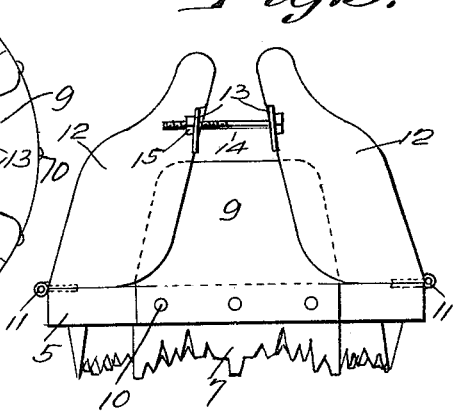
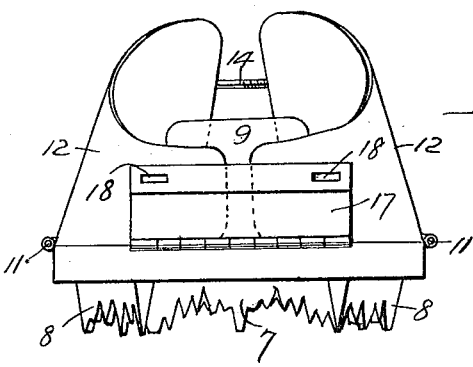
Witnesses
M. J. Pfeifer
L. E. Barkley
Inventor
Robert Jaffie,
by Frank S. Ankerman,
Attorney
THE NORRIS PETERS CO., PHOTO-LITHO., WASHINGTON, D. C.

UNITED STATES PATENT OFFICE.

ROBERT JAFFIE, OF WILKES-BARRE, PENNSYLVANIA.

HORSESHOE.

1,129,683. Specification of Letters Patent. Patented Feb. 23, 1915.

Application filed September 18, 1914. Serial No. 862,351.

*To all whom it may concern:*

Be it known that I, ROBERT JAFFIE, a citizen of the United States of America, and resident of Wilkes-Barre, in the county of Luzerne and State of Pennsylvania, have invented new and useful Improvements in Horseshoes, of which the following is a specification.

This invention relates to farriery and particularly to horse shoes; the said invention relating more directly to that class of horse shoes known as nailless shoes, the said shoes being held in place on the hoofs of animals by clamps which permit the ready application and removal of the shoe.

An object of this invention is to provide a horse shoe which is of especial value in preventing the slipping of horses where a snow fall or the formation of ice on the street comes unexpectedly and where temporary "roughening of the horse" is desirable, although a shoe embodying the present invention can be used for long periods of time under other conditions, as for instance, where the hoof becomes diseased or has acquired a crack or is so impaired as to make it inadvisable to use the ordinary nailed shoe. It is to be noted that the calks may be removed from the shoe during the summer months and reapplied when the shoe is to be used during the winter months.

A further object of this invention is to provide a horse shoe of the character indicated which will operate to compress the hoof so that quarter cracks or other defects may be cured, notwithstanding the animal is being used, as it has been found in practice that the animal will not experience discomfiture from such diseased hoof while the shoe, forming the subject matter of this invention, is used, as provision has been made for so regulating the compression as to adjust the clamping member to suit particular requirements.

With the foregoing and other objects in view, the invention consists in the details of construction and in the arrangement and combination of parts to be hereinafter more fully set forth and claimed.

In describing the invention in detail, reference will be had to the accompanying drawings forming part of this specification wherein like characters denote corresponding parts in the several views, and in which—

Figure 1 illustrates a view in elevation of a horse shoe embodying the invention; Fig. 2 illustrates a plan view thereof; Fig. 3 illustrates a view in front elevation; and Fig. 4 illustrates a view in rear elevation.

In these drawings 5 denotes the body of the shoe having heel calks 6 and a toe calk 7, which calks may be of any appropriate type but are here shown as provided with serrated tread surfaces 8 which better prevent slipping or accidental displacement of the shoe where slippery road beds are encountered.

At the front or toe of the shoe, I provide an abutting plate 9 against which the front of the hoof may press and this abutting place is of rather rigid construction so as to be unyielding, notwithstanding the hard wear to which it is subjected. It is preferably secured to the front of the shoe by fastenings 10 which may be in the form of rivets, screws, or the like. At each side of the shoe, I secure a hinge 11, to which a curved clamping plate 12 is secured, the said clamping plate being thereby swingingly secured to the shoe. Each clamping plate is of curved formation and is of such configuration as to lie on the outer surface of the hoof of a horse extending from a point at or near the heel to points at or near the toe so that the said clamping plates quite fully envelop the hoof, so that pressure may be exerted for the purposes heretofore stated. Each plate has at its forward edge an ear 13 apertured to receive a bolt 14, by which the clamping sections are drawn together to retain the shoe in place and, as has been stated, the clamping action may be increased or diminished according to the adjustment of the nut 15 on the said bolt. The heel of the shoe 5 is further provided with a hinge 16 to which a clamping member 17 is secured, the said clamping member being in position to be drawn against the rear ends of the clamping plates so that the said ends of the clamping plates may be forced against the rear of the hoof, this arrangement of parts being quite well shown in Figs. 1 and 2. The bar 17 has slots 18 which receive the straps 19, the said straps being intended to encircle the hock of the horse and be secured by the buckle 20, so that the straps may be drawn taut to adjustably force the bar against the rear of the clamping plates.

From an inspection of the drawing and from consideration of the foregoing description, it will be apparent that when the shoe is applied to the hoof of a horse, the bolt and nut may be manipulated to draw the clamping plates tightly against the outer surface of the hoof and that the straps 19 may be drawn to force the bar 17 so that it compresses the rear ends of the clamping member and forces them against the rear of the hoof, thereby causing a retention of the shoe on the hoof and exerting such pressure as will tend to compress a quarter crack, or other strain incident to the use of the animal.

I claim—

A horse shoe having an upwardly extending plate at the toe thereof forming an abutment, a hinge secured to the shoe at each side, a clamping plate secured to each of the hinges, means for drawing the forward ends of the clamping plates together to exert pressure on the hoof, a bar hingedly secured to the shoe at the heel and adapted to compress the rear ends of the clamping plates, and a flexible member connected to the said bar for holding the bar in engagement with the clamping plates.

In testimony whereof, I affix my signature in the presence of two witnesses.

ROBERT JAFFIE.

Witnesses:
WM. BREWSTER,
DAVID OPPENHEIM.

Copies of this patent may be obtained for five cents each, by addressing the " Commissioner of Patents. Washington, D. C."